US007186010B2

(12) United States Patent
Coushaine et al.

(10) Patent No.: US 7,186,010 B2
(45) **Date of Patent: *Mar. 6, 2007**

(54) LED LAMP AND LAMP/REFLECTOR ASSEMBLY

(75) Inventors: Charles M. Coushaine, Rindge, NH (US); Michael Tucker, Henniker, NH (US); Thomas Tessnow, Weare, NH (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/939,582

(22) Filed: Sep. 13, 2004

(65) Prior Publication Data

US 2005/0281047 A1 Dec. 22, 2005

Related U.S. Application Data

(60) Provisional application No. 60/580,063, filed on Jun. 16, 2004.

(51) Int. Cl.
*B60Q 1/00* (2006.01)
*F21V 29/00* (2006.01)
*F21V 7/20* (2006.01)

(52) U.S. Cl. ...................... 362/547; 362/373; 362/264; 362/345

(58) Field of Classification Search ................ 362/294, 362/345, 373, 574, 264
See application file for complete search history.

(56) References Cited

U.S. PATENT DOCUMENTS

| | | | | | |
|---|---|---|---|---|---|
| 5,068,771 | A * | 11/1991 | Savage, Jr. | ................. | 362/255 |
| 5,239,226 | A * | 8/1993 | Seredich et al. | ....... | 313/318.01 |
| 5,660,461 | A * | 8/1997 | Ignatius et al. | ............. | 362/241 |
| 6,367,949 | B1 * | 4/2002 | Pederson | ..................... | 362/240 |
| 6,773,138 | B2 * | 8/2004 | Coushaine | .................. | 362/656 |
| 6,874,914 | B2 * | 4/2005 | Desanto et al. | ............. | 362/372 |
| 6,955,451 | B2 * | 10/2005 | Coushaine et al. | ......... | 362/294 |
| 6,964,507 | B2 * | 11/2005 | Mohacsi | ...................... | 362/545 |
| 2003/0214810 | A1 * | 11/2003 | Zhang | ......................... | 362/294 |
| 2004/0057234 | A1 * | 3/2004 | Mohacsi | ...................... | 362/231 |
| 2005/0169006 | A1 * | 8/2005 | Wang et al. | ................ | 362/555 |

* cited by examiner

*Primary Examiner*—John Anthony Ward
*Assistant Examiner*—David Makiya
(74) *Attorney, Agent, or Firm*—William E. Meyer

(57) ABSTRACT

An LED lamp (10) having a substantially concave heat sink (12) having a raised, frusto-conical center (14) surrounded by an outer rim (16). The heat sink (12) is preferably aluminum or other metal and at least the frusto-conical center preferably has a reflective coating. To further aid in heat removal the outer rim (16) can be provided with a plurality of apertures (16*a*). A side-emitting LED (18) is mounted on the frusto-conical center (14). A cover (26) is fixed to the outer surface (22) and defines a volume (28) between the frusto-conical center (14) and the cover (26). A circuit (30) is located within the volume (28) and an electrical connection (32) provides connection to the LED (18). In another embodiment a cover (26*a*) is provided with studs (54) and a reflector (42*a*) is provided with studs (56) that engage barbs (50) formed in a heat sink (12*a*).

7 Claims, 5 Drawing Sheets

LED LAMP AND LAMP/REFLECTOR ASSEMBLY

This application claims the benefit of Provisional Patent Application No. 60/580,063, filed Jun. 16, 2004

TECHNICAL FIELD

This invention relates to electric lamps and particularly to electric lamps with light emitting diode (hereafter LED or LEDs) light sources. More particularly the invention is concerned with an electric lamp with an LED light source coupled to a heat sink with rapid mounting features

BACKGROUND ART

In the past, most automotive light sources have involved the use of incandescent bulbs. While working well and being inexpensive, these bulbs have a relatively short life and, of course, the thin filament employed was always subject to breakage due to vibration.

Recently some of the automotive uses, particularly the stoplight, have been replaced by LEDs. These solid-state light sources have incredible life times, in the area of 100,000 hours, and are not as subject to vibration failures. However, these LED sources have been hard-wired into their appropriate location, which increases the cost of installation. Additionally, the light sources have employed multiple LEDs, which increased the cost. It would therefore be an advance in the art if an LED light source could be provided that had the ease of installation of the incandescent light sources. It would be a still further advance in the art if an LED light source could be provided that achieved an industry accepted interchangeable standard to replace the aforementioned incandescent bulb and that used only a single LED. Alternatively, it would be advantageous to have a light source that could be permanently mounted without the need for any specific orientation.

DISCLOSURE OF INVENTION

It is, therefore, an object of the invention to obviate the disadvantages of the prior art.

It is another object of the invention to enhance LED light sources.

These objects are accomplished, in one aspect of the invention, by the provision of an LED lamp comprising a substantially concave heat sink having a raised, frusto-conical center surrounded by an outer rim. A side-emitting LED is mounted on the frusto-conical center. A circumferential planar area is provided between the frusto-conical center and the outer rim and has an outer surface and an inner surface. A cover is fixed to the outer surface in a manner to define a volume between the frusto-conical center and the cover. A printed circuit board is located in the volume and it has an electrical connection to the LED. At least one electrical contact is positioned in the cover for carrying electrical charges to the printed circuit board. An alternate embodiment utilizes studs and barbs for a permanent mounting.

This LED lamp forms a complete package that is easily installed in a suitable reflector already existing in an automobile and can be compatible with the previously used incandescent sources.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
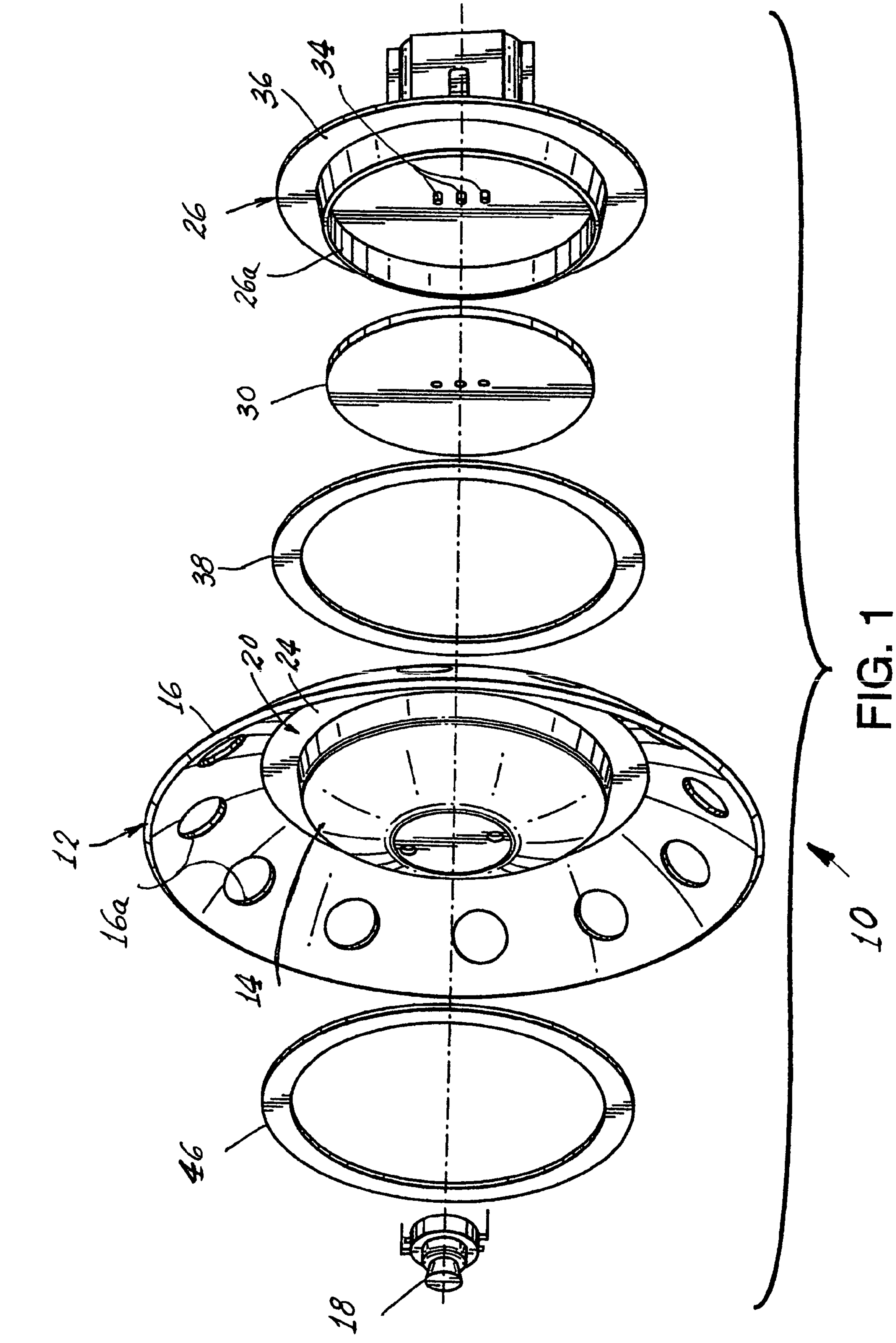
FIG. 1 is an exploded perspective view of a lamp according to an embodiment of the invention.

Referring now to FIG. 1 there is shown an LED lamp 10 having a substantially concave heat sink 12 having a raised, frusto-conical center 14 surrounded by an outer rim 16. The heat sink 12 is preferably formed of aluminum or other metal and at least the frusto-conical center preferably has a reflective coating thereon for reasons that will become apparent hereafter. To further aid in heat removal the outer rim 16 can be provided with a plurality of apertures 16*a*.

A side-emitting LED 18 is mounted on the frusto-conical center 14. In a preferred embodiment, the side-emitting LED will have a 60-degree spread +/−30 degrees from the perpendicular to an axis 19 (see FIG. 2). A circumferential planar area 20 is formed between the frusto-conical center 14 and the outer rim 16 and has an outer surface 22 and an inner surface 24. A cover 26 is fixed to the outer surface 22 in a manner to define a volume 28 between the frusto-conical center 14 and the cover 26, as shown most clearly n FIG. 2. In the embodiment shown the cover 26 has a circumferential flange 36 and the flange 36 is fixed to the outer surface 22 by a double-sided tape 38. This manner of mounting has several advantages in that it is easy and convenient and also helps to form an environmental seal to keep out dirt and moisture; however, other mounting means such as threads, bayonet arms, screws, rivets or other latching means can also be employed, one of which will be described hereinafter.

A printed circuit board 30 is located within the volume 28 and has the usual electrical traces thereon (not shown) and an electrical connection 32 provides electrical connection to the LED 18.

Figure 2:
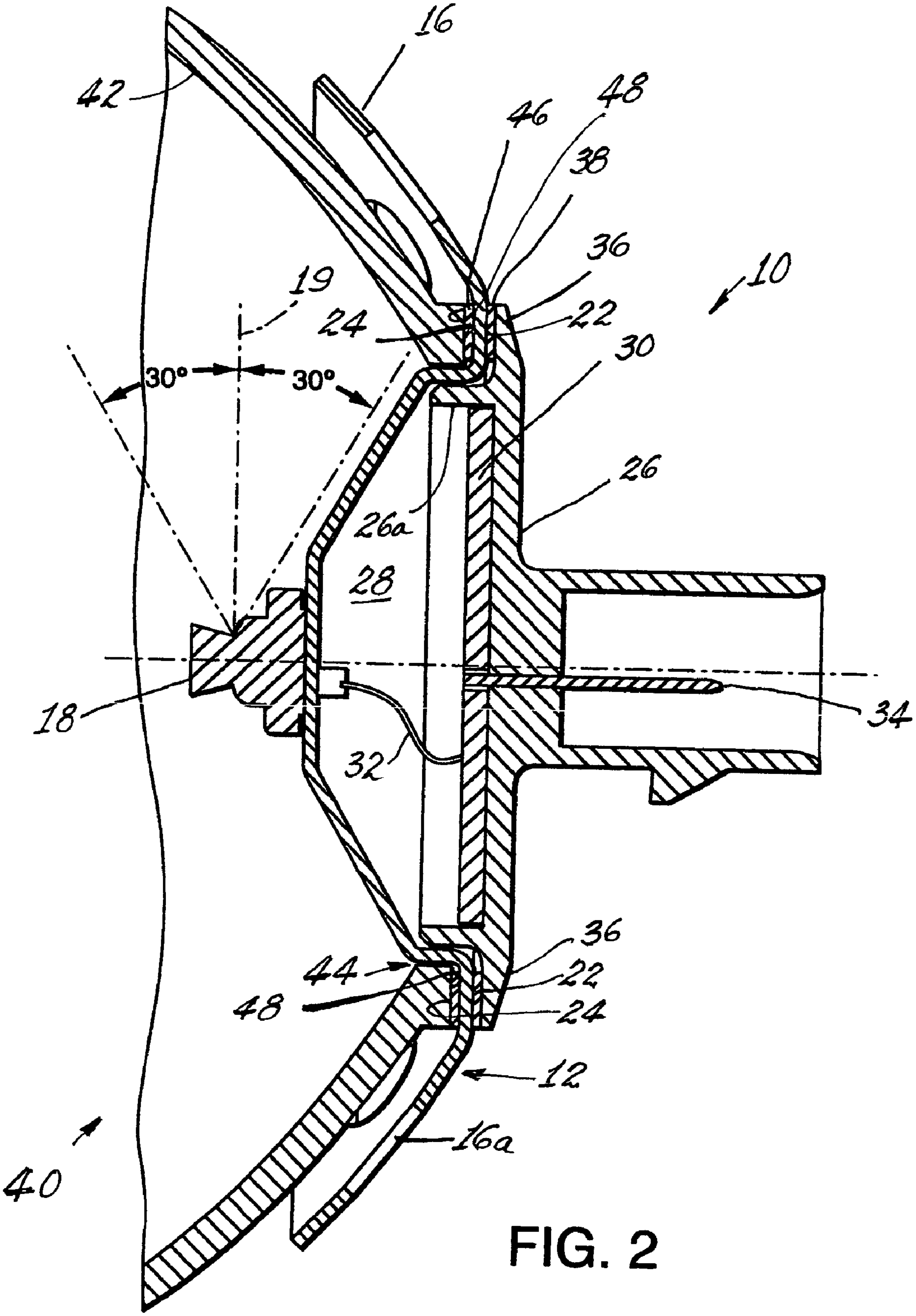
FIG. 2 is an elevational, section view of a lamp positioned in a reflector.

In the embodiment shown in FIGS. 1 and 2 the cover 26 is provided with an upstanding annular wall 26*a* and the printed circuit board 30 fits within this wall, making for a secure mounting. At least one electrical contact 34 in cover 26 provides for carrying electrical charges to the printed circuit board 30. In FIG. 2 three such electrical contacts are shown.

There is thus provided an LED lamp that is simple to construct and to use. Adequate heat sinking is achieved by mounting an LED directly to a heat sink, which also carries the electrical circuitry and connectors for connection to a power source.

In another embodiment there is provided an LED light source 40 for a vehicle that comprises a substantially concave reflector 42 having an aperture 44 in its bottom. The LED lamp 10 described above is fitted to the reflector 42 by positioning a second doubled-sided tape 46 between the inner surface 24 of the circumferential planar area 20 and the reflector 42. Preferably an annular flat surface 48 is provided on the reflector 42 to accommodate the tape 46. Of course, other mounting systems can be employed such as the cammed ears used on many automobiles today, or other threaded structures, or screws, rivets or bayonet arms or other mounts that will be apparent to those skilled in the art.

Figure 3:
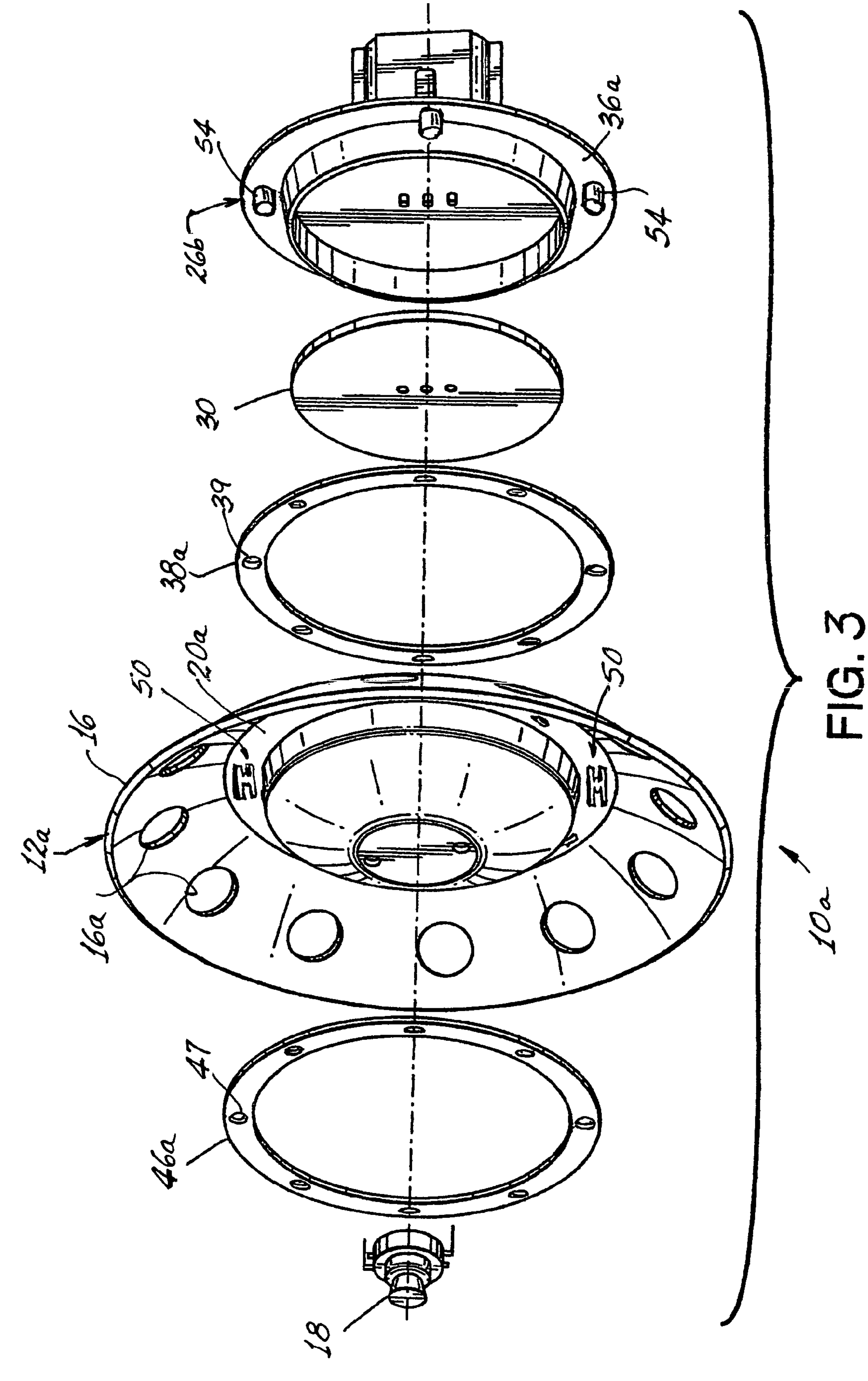
FIG. 3 is an exploded perspective view of an alternate embodiment of the invention.
Figure 4:
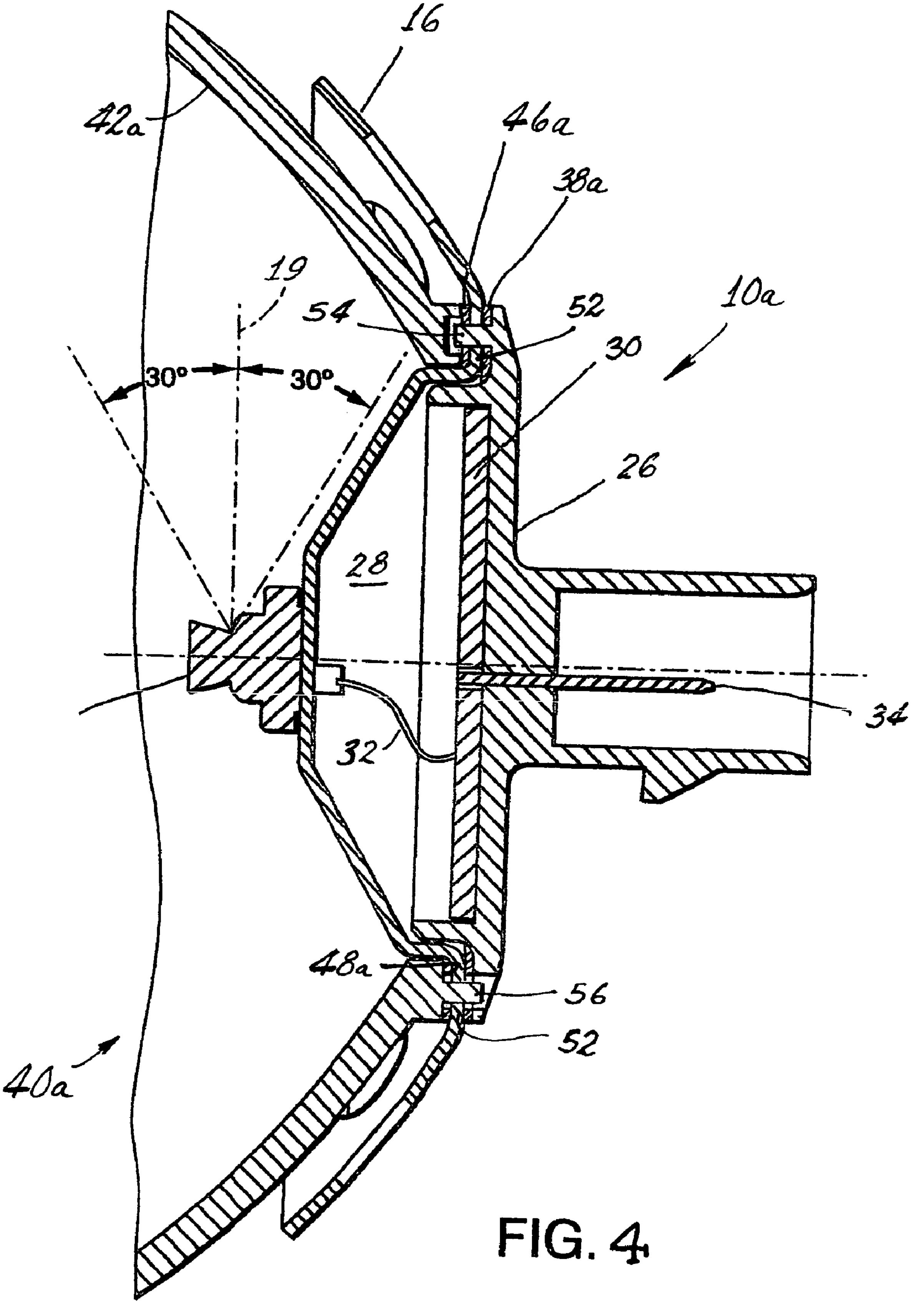
FIG. 4 is an elevational, sectional view of the lamp of FIG. 3 positioned in a reflector.
Figure 5:
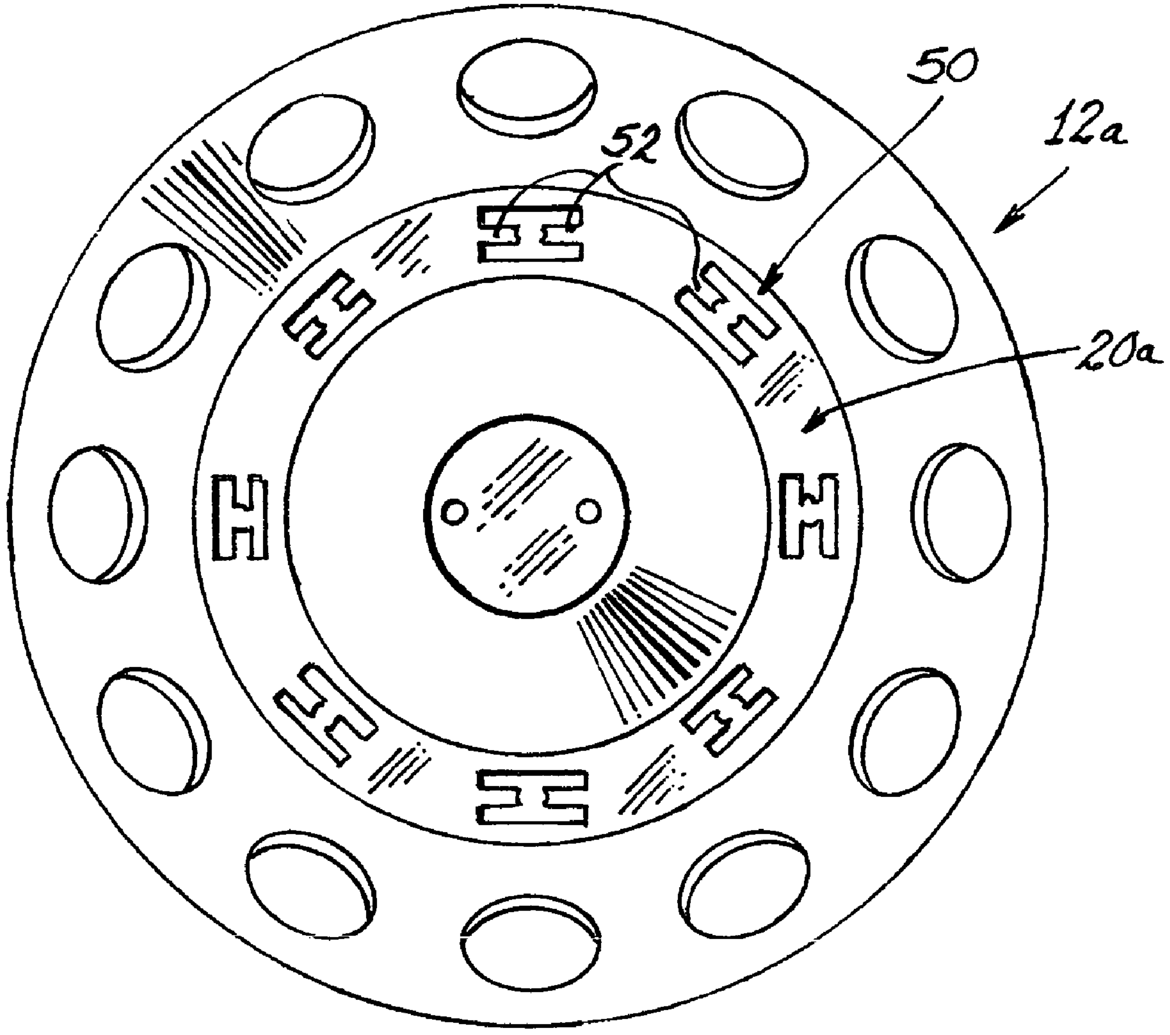
FIG. 5 is a plan view of a heat sink employed with an embodiment of the invention.

In yet another embodiment an LED lamp 10*a* and an LED light source 40*a* are shown in FIGS. 3 and 4, respectively. The light source 40*a* includes an LED lamp 10*a* that has a heat sink 12*a* (shown in FIG. 5), with a circumferential planar area 20*a* provided with a plurality of stud-receiving barbs 50. The barbs 50 have prongs 52 that engage studs 54 formed on flange 36*a* of a cover 26*b* and studs 56 formed on an annular flat surface 48*a* of a reflector 42*a*. Double-sided tapes 38*a* and 46*a* are used as previously described; however, the tapes 38*a* and 46*a* are provided with stud-receiving apertures 39 and 47, respectively. While the number of stud-receiving barbs 50 can vary, in a preferred embodiment there are eight such barbs positioned about the circumferential planar area 20*a*, and the flange 36*a* and the annular flat surface 48*a* are provided with four studs each. When assembled, the studs 54 alternate with the studs 56 around the periphery.

This arrangement insures a very secure, permanent mounting and the double-sided tapes continue to provide a good environmental seal to keep out dirt and moisture. Alignment problems are substantially reduced since the LED light source 40*a* is symmetrical about the X axis, the Y axis and the Z axis.

Preferably, the heat sinks 12 and 12*a* are spaced away from reflectors 42 and 42*a* so that air may circulate freely and aid in the necessary cooling.

In a specific embodiment, the heat sinks 12 and 12*a* were made from a deep drawn aluminum sheet, the front side of which was aluminized. The heat sinks 12 and 12*a* had an outside diameter of 65 millimeters, while the inner platform section had a diameter of 33 millimeters. The axial extension from the middle of the LED 18 to the forward mount of the first seal was 12.2 millimeters, and the axial extension from the same front side of the first seal to the rearmost part of the socket was 19.8 millimeters. The side emitting LED 18 had a 60-degree spread +/−30 degrees from the perpendicular to an axis 19. The heat sinks 12 and 12*a* had a thickness of 0.75 millimeters and had twelve holes 16*a* evenly spread around the exterior radial extension or rim 16.

While there have been shown and described what are present considered to be the preferred embodiments of the invention, it will be apparent to those skilled in the art that various changes and modifications can be made herein without departing from the scope of the invention as defined by the appended claims.

What is claimed is:

1. An LED light source for a vehicle comprising:

a substantially concave reflector having an aperture in its bottom;

an LED lamp having a substantially concave heat sink having a raised, frusto-conical center surrounded by an outer rim, said frusto-conical center being positioned within said aperture and being fixed to said reflector;

a side-emitting LED mounted on said frusto-conical center;

a circumferential planar area between said frusto-conical center and said outer rim having an outer surface and an inner surface;

a cover fixed to said outer surface in a manner to define a volume between said frusto-conical center and said cover;

a printed circuit board located in said volume having electrical connection to said LED; and at least one electrical contact in said cover for carrying electrical charges to said printed circuit board.

2. The LED light source of claim 1 wherein said LED lamp is fixed to said reflector by a double-sided tape positioned between said inner surface of said circumferential planar area and said reflector.

3. The LED light source of claim 2 wherein said cover includes a flange and said flange is fixed to said outer surface.

4. The LED light source of claim 3 wherein said flange is fixed to said outer surface by a double-sided tape.

5. An LED source for a vehicle comprising:

a substantially concave reflector having an aperture in its bottom with an annular flat surface surrounding said aperture;

a plurality of reflector studs on said annular flat surface projecting rearward away from said reflector;

an LED lamp having a substantially concave heat sink with a raised, frusto-conical center surrounded by an outer rim, said frusto-conical center being positioned within said aperture;

a side-emitting LED mounted on said frusto-conical center;

a circumferential planar area between said frusto-conical center and said outer rim, said circumferential planar area having an outer surface and an inner surface;

a plurality of barbs formed in said circumferential planar area;

a cover fixed to said outer surface in a manner to define a volume between said frusto-conical center and said cover, said cover having a circumferential flange having a plurality of cover studs projecting forwardly toward said reflector;

a printed circuit board located in said volume having electrical connection to said LED; and at least one electrical contact in said cover for carrying electrical charges to said printed circuit board; said reflector studs and said cover studs being engaged in said plurality of barbs formed in said circumferential planar area.

6. The LED light source of claim 5 wherein said LED lamp has a double-sided tape positioned between said inner surface of said circumferential planar area and said reflector.

7. The LED light source of claim 6 wherein said LED lamp has a double-sided tape between said cover flange and said outer surface.

* * * * *